No. 804,962. PATENTED NOV. 21, 1905.
S. LOE.
VOTING MACHINE.
APPLICATION FILED MAR. 28, 1904.

Witnesses,
H. D. Kilgm
E. W. Jeppesen.

Inventor,
Syver Loe.
By his Attorneys,
Williamson & Merchant

No. 804,962. PATENTED NOV. 21, 1905.
S. LOE.
VOTING MACHINE.
APPLICATION FILED MAR. 28, 1904.
9 SHEETS—SHEET 8.

Witnesses.
H. D. Kilgore
E. W. Jeppeson

Inventor
Syver Loe.
By his Attorneys.
Williamson & Merchant

No. 804,962. PATENTED NOV. 21, 1905.
S. LOE.
VOTING MACHINE.
APPLICATION FILED MAR. 28, 1904.

Witnesses.
H. S. Kilgore
E. W. Jeppesen

Inventor.
Syver Loe,
By his Attorneys.
Williamson & Merchant

UNITED STATES PATENT OFFICE.

SYVER LOE, OF MINNEAPOLIS, MINNESOTA.

VOTING-MACHINE.

No. 804,962.  Specification of Letters Patent.  Patented Nov. 21, 1905.

Application filed March 28, 1904. Serial No. 200,463.

*To all whom it may concern:*

Be it known that I, SYVER LOE, a citizen of the United States, residing at Minneapolis, in the county of Hennepin and State of Minnesota, have invented certain new and useful Improvements in Voting-Machines; and I do hereby declare the following to be a full, clear, and exact description of the invention, such as will enable others skilled in the art to which it appertains to make and use the same.

My present invention relates to voting-machines, and has for its object to improve the same in the several particulars hereinafter noted.

The invention consists of the novel devices and combinations of devices hereinafter described and defined in the claims.

The machine herein illustrated and claimed involves a so-called "vote-limiting" mechanism, certain features of which are disclosed and broadly claimed in my prior patent, No. 712,079, issued of date October 28, 1902, entitled "Voting-machine." Some features herein disclosed and claimed are also disclosed, but not claimed, in my pending application, Serial No. 155,461, filed of date May 4, 1903, entitled "Voting-machine."

In the machines disclosed in my prior patent and application above identified the registers and register-actuators were arranged in vertical columns or series and each column or series was appropriated to a different territorial ticket—such as the National, State, county, and municipal tickets—and the candidates for the different parties were interspersed and arranged in the regular order in the different columns. Furthermore, the said vertical columns or series of registers and register-actuators were arranged in groups, the number of each in a particular group being equal to the number of candidates for the particular office to which the group was appropriated. For each group of actuators there was a vote-limiting device arranged to operate after a predetermined number of votes (one or more) had been selected for a particular office to lock or render inoperative all other actuators of that group. In my present machine I arrange the registers and register-actuators in several columns or series and appropriate or assign one column to each political party. Also in the most approved form of the machine I provide a column of such registers and register-actuators for independent votes and so arrange them that a voter may at will vote the names of a person not represented on any ticket for any office represented on the several political tickets. In the present arrangement of the columns of registers and register-actuators those registers and register-actuators which are appropriated to the same office are located in horizontal line with each other and for offices to which several candidates are to be elected—such, for instance, as judges—each column is provided with a group of registers and register-actuators equal in number to the number of judges to be elected, and the corresponding groups of the several columns are located in horizontal line with each other. For offices to which but one candidate is to be elected there is provided a vote-limiting bar or device which is subject to the corresponding key of the several columns and which when one of the keys has been moved will lock the corresponding keys of the other columns. For each horizontal row of register-actuators of the several alined groups of the said registers and register-actuators provided for offices to which several candidates may be elected, as above stated, there is provided a vote-limiting bar or device similar to those above noted, which bar in this instance is used as a primary vote-limiting device. For each such group of primary vote-limiting devices there is a secondary vote-limiting device, made up of a group of shiftable or expansible elements subject to the said primary vote-limiting devices. This secondary vote-limiting device will permit the voting for the proper number of candidates for the particular office and then will prevent further voting or casting of votes for that office.

The machine involves many other novel and important features, which will be hereinafter set forth and defined in the claims.

The invention is illustrated in the accompanying drawings, wherein like characters indicate like parts throughout the several views.

*Framework and supports.*—Advisably there is provided a case or cabinet 1, formed with a horizontally-extended base 2 and with removable front and rear plates 3 and 4, respectively. Inclosed within this case is a skeleton framework made up, as shown, of a plurality of vertical angle-irons 5, vertical bearing plates or strips 6, and horizontal connecting-brackets 7. The bearing-strips 6 are located at the front of the frame, are vertically disposed, and are attached to vertically-disposed ticket-holding strips 8, which strips 8 close the spaces between said strips 6 and are provided with overturned edges, adapting them to hold the tickets or ballot-strips $z$. Rigidly secured to the rear left-hand portion of the brackets 7 is a vertically-disposed supporting-bar 9, and rigidly secured to the rear right-hand portion of the said brackets 7 is a vertically-disposed supporting-bar 10. Rigidly secured within the case to the bottom thereof are shaft-bearings 11, 12, and $12^a$.

*Registers and coöperating escapements.*—The registers, which are indicated as entireties by the numeral 13 and may be of any standard or approved construction, are arranged in vertical columns, the registers of each column being rigidly secured to a vertically-disposed supporting-bar 14. (See Figs. 2, 3, and 16 to 19, inclusive.) In the machine illustrated there are three of these register-supporting bars 14, and they are mounted for slight vertical movements on the front portions of the frame-brackets 7, being preferably connected therewith by slot-and-screw joints 15. (Best shown in Figs. 18 and 19.) The unit member of each register is connected to move with a pin-wheel or escapement-gear 16, which is provided with ten laterally-projecting studs or pins. Further than as above described the construction of the registers need not for the purposes of this case be considered. For coöperation with each escapement-wheel 16 there is provided a so-called "escapement-dog" 17 in the nature of a vibrating lever, pivoted at 18 to a projecting lug 19 of the corresponding supporting-bar 14. At their forward ends the dogs 17 are formed with reversely-projecting and reversely-beveled lugs $17^a$, which act upon the projecting pins of the coöperating escapement-wheels 16 in a manner presently to be described. Forward of their pivots the dogs 17 are provided with laterally-projecting ears $17^b$, and at the rear of their pivots they are provided with similar ears $17^c$.

In the machine illustrated there are three columns of the registers above described, each column being of course carried by a different supporting-bar 14. One of these columns is assigned to the Republican ticket, another to the Democratic ticket, and the third is intended for use in connection with a column of register actuators or keys that are especially adapted for use in voting for constitutional amendments and other questions which may be answered by "yes" or "no." For the column of register-actuators assigned to independent votes—that is, to the voting for persons not represented upon any ticket—registers or tallies are not provided in the machine illustrated, the record of such voting being kept track of by other means hereinafter briefly noted.

The lower ends of the bars 14 depend into the base 2 of the case 1 and are provided with laterally-projecting pins $14^a$, that work in cam-grooves $20^a$ of a horizontally-disposed jointed cam-bar 20. The cam-bar 20 is mounted in bearings 91, supported by the base 2 of the case 1. The joints $20^b$ of said bar 20 come between the bearings 21 and prevent binding of the bar in its bearings. By sliding movements of the cam-bar 20 the supporting-bars 14 may be slightly raised and lowered. Normally, however, the pins $14^a$ stand in the upper portions of the cam-grooves $20^a$, and the said bars 14, and the registers carried thereby, are raised, the said registers when thus raised being held in inoperative positions, as will hereinafter appear. The means for reciprocating the cam-bar 20 will be described later on.

*Register-actuating slides or keys.*—The register-actuating slides or keys, of which in the machine illustrated there are four vertical columns, are mounted to slide from front to rear of the machine in suitable bearings afforded by the vertical frame-bars 5 and 6, and all thereof are alike in some respects although different in others. The slides of the two intermediate columns which are assigned to the Republican and Democratic parties are designated by the numeral 22, the slides of the left-hand column, (as viewed in Fig. 2,) which are assigned to independent votes are designated by the notation $22^a$, while the slides in the extreme right-hand column which are assigned to constitutional amendments or for other uses than those to which the slides in the other columns are assigned are designated by the notation $22^b$.

Figure 1:
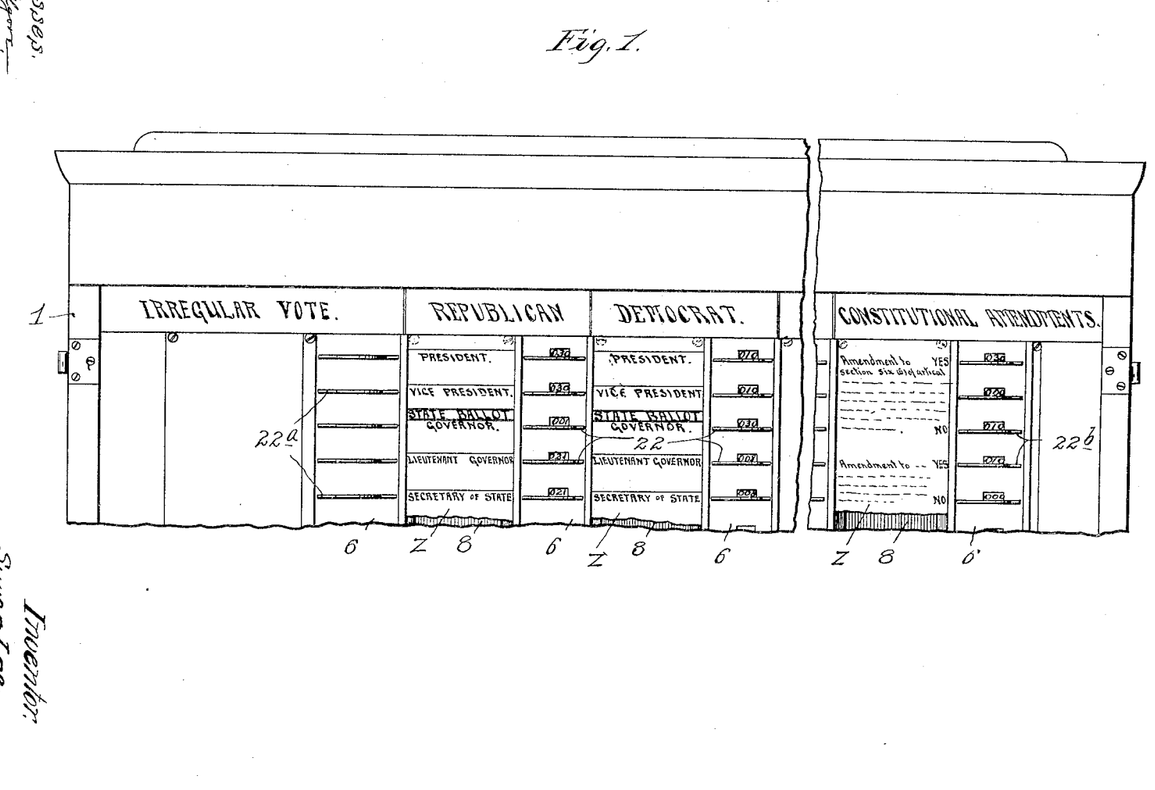
Figures 1 and $1^a$ are supplemental views, with parts broken away, showing the machine in front elevation.
Figure 2:
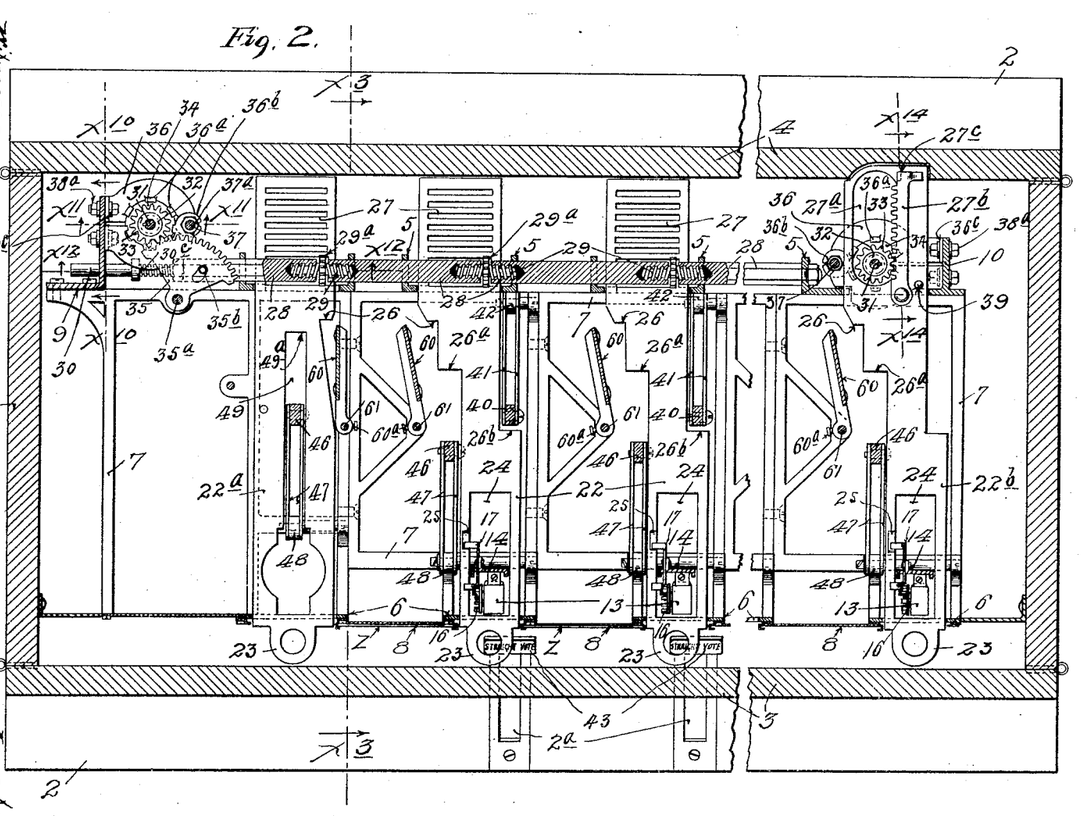
Fig. 2 is a horizontal section on the line $x^2 x^2$ of Fig. $1^a$.

At their forwardly-projecting ends all of the above-noted actuating slides or keys are shown as formed with finger-pieces 23, by means of which they may be readily engaged to pull them forward. The slides or keys 22 and $22^b$ are all formed with large slots 24, through which the register-supporting bars 14 are passed, the said slots being long enough to permit free forward movements of the said slides. Each of said keys 22 and $22^b$ is also provided near its forward end with a cam-lug 25 for action on the ears $17^b$ and $17^c$ of the coöperating escapement-dogs 17, in a manner fully set forth under the heading "Operation." The slides of the four columns are all provided with lock-shoulders 26, for a purpose which will hereinafter appear. The slides 22 and $22^b$ are formed with bearing-shoulders $26^a$, for a purpose which will also hereinafter appear, and the said slides 22 are further formed with bearing-shoulders $26^b$, for another purpose which will hereinafter appear. At their rear ends the slides 22 and $22^a$ are provided with very wide-faced racks 27, formed by cutting parallel slits therein, as best shown in Fig. 2. The rear ends of the slides $22^b$ are, as shown, formed with large slots $27^a$, and at one side of each said slot is a small rack-bar $27^b$, pivoted to said slides at one end and having interlocking engagement therewith at $27^c$. (See Figs. 2 and 6.)

*Vote-limiting mechanism.*—In the immediately-following description of the vote-limiting mechanism only those parts which coöperate with the slides or keys 22 and $22^a$ will be considered. The limiting-lock mechanism which coöperates with the slides $22^b$ will, however, be considered later on.

In the present machine only two colums of the keys or slides 22 are shown, these being appropriated to the Republican and Democratic parties; but in practice as many columns of these keys as may be required or desired may be provided, so as to adapt the machine for elections where a large number of political parties are represented. For each horizontally-alined row of actuating-slides 22 $22^a$ there is an extensible lock shaft or bar made up of non-rotary sections 28 and rotating coupling-shafts 29. The coupling-shafts 29 between the abutting ends of the sections 28 are provided with spur-pinions $29^a$, and their oppositely-projecting ends are reversely threaded and engage internal right and left threaded seats in the said sections 28. The right-hand sections 28, as shown, are rigidly secured to one of the vertical bars 5; but all of the sections 28 to the left of this fixed section are free to slide endwise through angular seats formed in the other members of the said bars 5. The said sections 28 are shown as hexagonal in cross-section; but they might be square or of any other angular form, which will prevent them from rotating in correspondingly-formed seats in the said bars 5. They might even be round and provided with keys. An adjustable stop-plunger 30 is provided as an extension for the left-hand members of the sliding sections 28. Said plungers 30 have screw-threaded stems 38, which work in screw-threaded seats in the said sections 28 and are locked thereto by jam-nuts $30^b$. Furthermore, said plungers 30 work through suitable seats $9^a$, formed in the angle-bar 9, and are provided with stop-collars $30^c$, which engage the flange of the said bar 9 to limit the spreading movements of the sections 28.

Each of the racks 27 of the slides 22 and $22^a$ mesh with one of the pinions $29^a$ of the threaded coupling-shafts 29. As is evident, when one of the said slides 22 or $22^a$, as the case may be, is drawn forward to its limit, the corresponding reversely-threaded coupling-shaft 29 will be rotated, and the lock bar or rod made up of the elements 28, 29, and 30 will be distended or lengthened out a predetermined distance. Where this distensible bar is applied for use in connection with a horizontal row of actuating-slides which are appropriated to an office to which but one candidate may be elected—such, for instance, as the office of Governor—the stop-plunger 30 should be so adjusted that one step of movement imparted thereto by any one of the three horizontally-alined slides 22 $22^a$ will bring the stop-collar $30^c$ against the flange of the bar 9 and hence lock the other two slides of the said horizontal row in normal inoperative positions. In this case the distensible lock-bar in itself affords a lock or vote-limiting device for the horizontally-alined actuating-slides of a particular office. It will also be noted and it should be remembered that a forward movement of one of the "independent-vote" slides $22^a$ has the same effect on the locking-bar as is produced by a similar movement of one of the slides 22, which are assigned to definite political parties. It will also be understood that the so-called "distensible locking-bar" might have its stop-collar $30^c$ or other stop element located outward of the flange of the bar 9, in which case the slides should be so positioned that their racks 27 would engage the upper instead of the lower portions of the pinions $29^a$. It should also be noted, particularly by reference to Fig. 2, that the racks 27 are of such width as to permit sliding or lateral traveling movements of the pinions $29^a$ over the same, as is necessary under the extending and contracting movements of the lock-bar.

Figure 4:
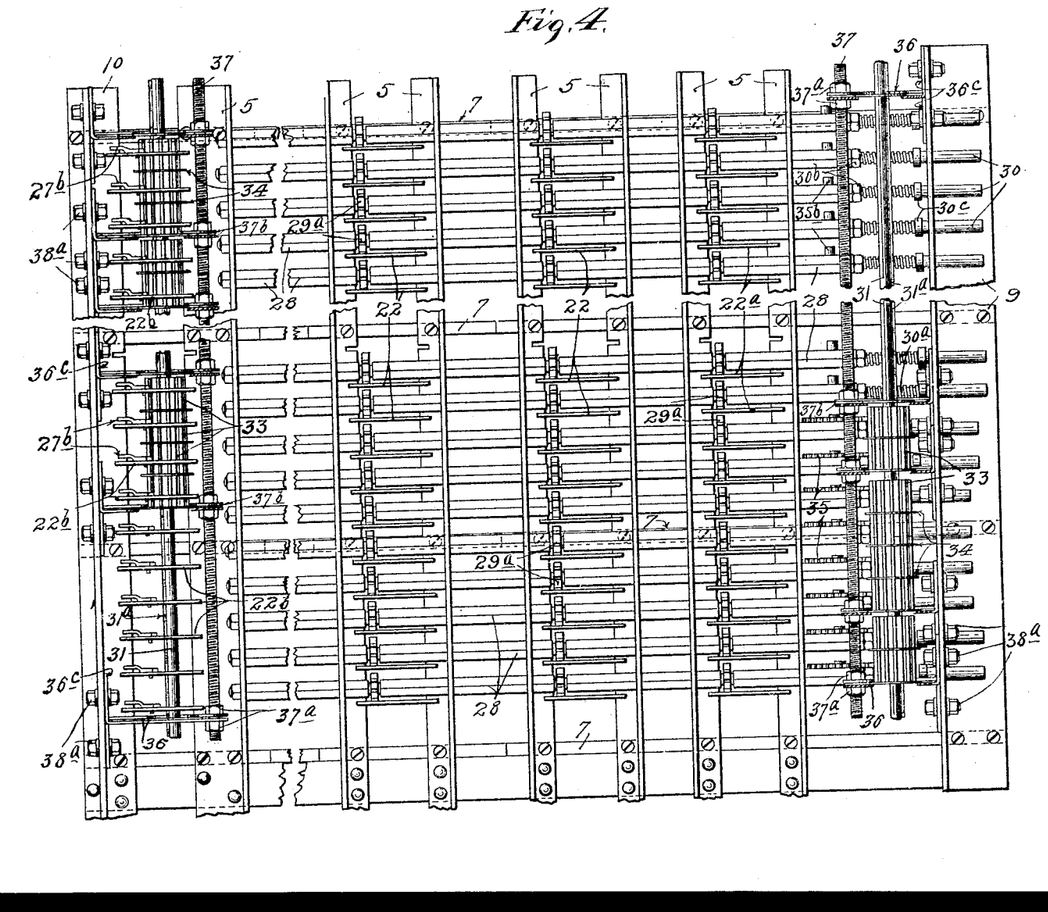
Fig. 4 is a view in rear elevation, with parts broken away, showing the internal mechanism of the machine.
Figures 8, 9, 10, 11, 12, 14:
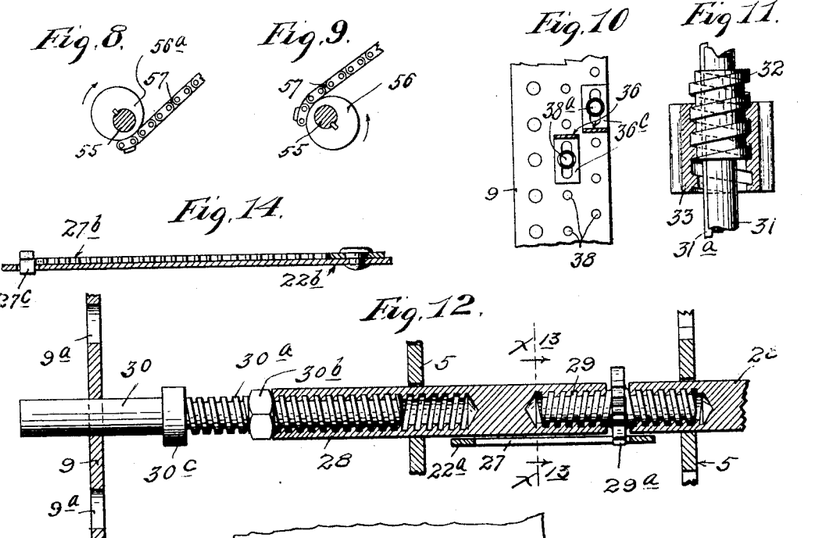
Figs. 8 and 9 are details in section respectively on the lines $x^8$ $x^8$ and $x^9$ $x^9$ of Fig. 5.
Fig. 10 is a detail in section on the line $x^{10}$ $x^{10}$ of Fig. 2.
Fig. 11 is a detail in section approximately on the line $x^{11}$ $x^{11}$ of Fig. 2.
Fig. 12 is a detail in section approximately on the line $x^{12}$ $x^{12}$ of Fig. 2.
Fig. 14 is a detail in section on the line $x^{14}$ $x^{14}$ of Fig. 2.

For group-voting, as already indicated, there is a plurality of distensible lock-bars used as primary lock devices, the number of such bars being equal to the number of candidates who may properly be elected to the particular office to which the particular group of lock devices has been assigned. For coöperation with such groups of primary lock-bars I provide lock mechanism herein for distinction termed "secondary lock devices," which are arranged to operate on the plan set forth and broadly claimed in my prior United States Letters Patent No. 712,079, referred to above. This secondary lock mechanism is shown at the left in Fig. 2, at the right in Fig. 4, and certain details thereof are shown in Figs. 10 and 11. Referring to the same in detail, the numeral 31 indicates a vertically-disposed non-rotary shaft, which is rigidly supported at its ends from the framework of the machine by any suitable means. This shaft is provided with a long key 31$^a$, which runs nearly or quite from end to end thereof. Mounted to slide on said shaft, but held against rotation thereon by said key 31$^a$, is a vertically-disposed series of externally-threaded hubs 32, on each of which hubs is mounted with screw-threaded engagement a spur-pinion 33, which acts as a nut. Mounted on said shaft between said sliding hubs 32 are washers 34. The same kind of washers are also placed above the upper hub and below the lower hub, and all of the said washers are held against rotation by the shaft-key 31. In the arrangement illustrated each pinion 33 meshes with a segmental gear 35, which is pivoted on a vertical shaft 35$^a$ and is connected by a slot-and-pin joint 35$^b$ with the left-hand section 28 of the corresponding distensible primary lock-bar or device. (See Figs. 2 and 4.) The pinions 33 are very much wider than the segmental gears 35, so as to permit the former to move laterally, while maintaining engagement with the latter. The said segmental gears 35 serve to transmit and multiply motion from the coupled left-hand sections 28 to the said pinions 33. The sliding hubs and gears are separated into groups by stop-brackets 36, (see Figs. 2, 4, and 10,) advisedly formed each in two sections having segmental seats formed by laterally-offset lugs 36$^a$, which embrace and hold certain of the washers 34. The sections of the stop-brackets 36 interlock or overlap at 36$^b$ with a vertically-disposed screw-rod 37, provided with pairs of clamping-nuts 37$^a$, which clamp the said ends, as shown in Figs. 2 and 4. The screw-rod 37 and its nuts 37$^a$ tie together and brace the several stop-brackets. The sections of said stop-brackets 36 are provided with slotted feet 36$^c$, and the projecting flange of the vertical angle-bar 9 is formed with vertically-disposed series of perforations 38, through which and the slotted feet 36$^c$ short nutted bolts 38$^a$ are passed to adjustably secure the said stop-brackets to the said supporting-bar 9. The importance of being able to apply the stop-brackets to any one of the several washers, so that the number of hubs and pinions may be quickly and easily varied, thereby adapting the machine to the conditions of different elections, is obvious.

At the right in Fig. 4 are shown three groups of hubs and pinions and coöperating parts. The intermediate group is composed of four hubs, four pinions, and four distensible lock-bars or primary locks. Each rotary step of movement imparted to one of the pinions 33 of the group causes the upper pinion of the group to move laterally upward one step of movement. In the said central group the upper pinion 33 normally stands four steps of lateral movement away from the overlying stop-bracket 36. The upper and lower groups comprise each but two pinions and coöperating parts, and the upper pinions of said groups normally stand below their overlying brackets 36 two steps of lateral or vertical movement. As is evident, the intermediate group, involving the four pinions, is assigned to an office, such as judges of the district court, to which four candidates are to be elected, while the upper and lower groups are assigned to offices to which two candidates may be elected.

For coöperation with the actuating slides or keys 22$^b$ there is provided a vertical column of hubs 32, pinions 33, brackets 36, and coöperating parts constituting a vote-limiting mechanism, such as employed in connection with the primary lock devices or distensible lock-bars, above described. In this instance, however, the said primary lock devices or distensible bars have no action upon the said pinions and hubs, but on the contrary the said pinions are directly engaged by the racks 27$^b$ of the said slides 22$^b$, as shown at the right in Fig. 2 and at the left in Fig. 4. Again, in this instance the stop-brackets 36 are interposed between certain of the pinions, so as to divide the vote-limiting mechanism into the proper groups for coöperation with the slides 22$^b$.

As before stated, the column of slides 22$^b$ are adapted for use in voting for or against constitutional amendments, or similar questions which may be answered by "yes" or "no." Such amendments when printed on the ticket will occupy considerable vertical space, and the words "Yes" and "No" printed in connection therewith will usually come quite far apart in vertical direction. Such of the slides as come between those slides 22$^b$ that aline with the words "Yes" and "No" should be thrown out of action—that is, locked so that they cannot be moved. This may be conveniently done by dropping lock-pins 39 through perforations in the said slides, which pins will engage the back of one flange of the right-hand supporting-bar 10, as shown in Fig. 2. This right-hand column of slides 22$^b$ and the coöperating vote-limiting mechanism are, however, capable of use in connection with a party-ticket, since they operate on the same general plan set forth in my pending application above identified.

Figure 3:
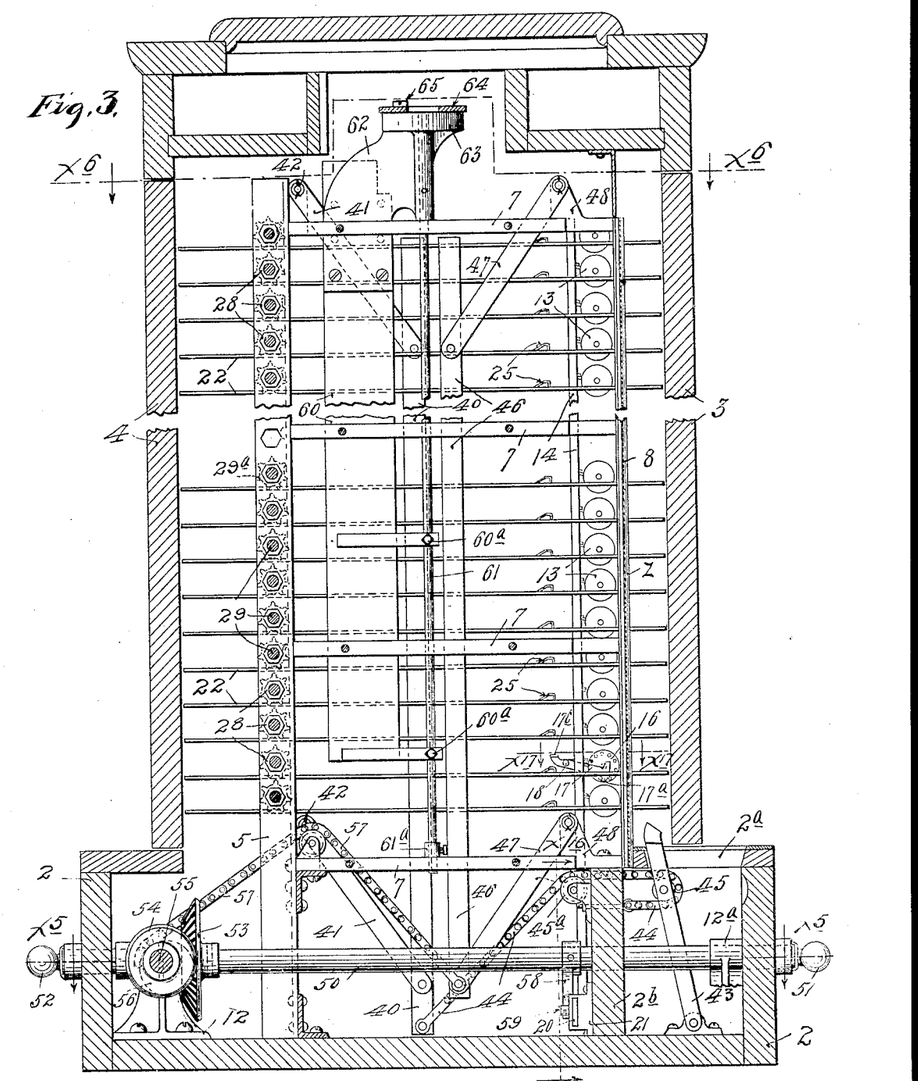
Fig. 3 is a vertical section on the line $x^3 x^3$ of Fig. 2, some parts being broken away. Fig. $3^a$ is a detail in perspective of a portion of certain of the parts shown near the bottom of Fig. 3.
Figure 3A:
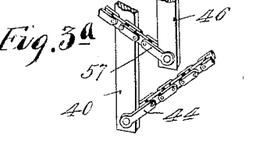

*Straight-vote device.*—In connection with the columns of register-actuating slides 22, which are assigned to the definite political parties, such as the Republican and Democratic parties, there is provided means whereby by the action of a single lever or key all of the slides of any selected column may be simultaneously moved forward or into so-called "set" positions. As the best means for accomplishing this result I provide vertically-disposed so-called "straight-vote push-bars" 40, supported at their ends for parallel swinging movements by links 41, pivoted at 42 to lug projections on certain of the supporting-bars 5, as shown in Figs. 2 and 3. These push-bars 40 normally stand in lowered positions, as shown in Fig. 3, and in such positions (see Fig. 2) that when swung upward and forward they will engage the shoulders 26$^b$ of the slides 22 and force the said slides forward into set positions. For each straight-vote push-bar 40 there is a straight-vote lever 43 pivoted to the forward portion of the base 2, with its free upper end projecting through a slot 2$^a$ in the upper portion thereof just in front of the ticket-holders, which in the illustration given hold the Republican and Democratic tickets. These levers 43 are operatively connected to the respective push-bars 40, as shown, by means of link chains 44, attached at their rear ends to the lower ends of the said bars 40 and at their forward ends to a vertical partition 2$^b$ of the base 2. The said chains 44 run over small sheaves 45, carried by said levers, and over guide-sheaves 45$^a$ on the said partition 2$^b$. As is evident, when one of these levers 43 is drawn forward the corresponding straight-vote push-bar 40 will be moved forward and upward and will drive all of the slides 22 of the corresponding column simultaneously forward into set positions.

*Restoring mechanism.*—For simultaneously restoring all of the set-actuating slides to normal positions I provide in the machine illustrated four so-called "restoring-bars"—to wit, one for each vertical column of such slides. These restoring-bars 46 are vertically disposed and are supported by pairs of parallel links 47, pivoted thereto, and to brackets 48, supported by the framework of the machine. (See Figs. 2 and 3.) The two intermediate bars 46 are arranged to act upon the shoulders 26$^a$ of the slides 22, while the right-hand bar 46 is arranged to act upon the shoulders 26$^a$ of the slide 22$^b$. The left-hand restoring-bar 46 is, as shown, passed through slots 49, cut in the slides 22$^a$, and acts against bearing-surfaces 49$^a$ at the rear extremities of said slots. Normally the said restoring-bars 46 stand as shown in Figs. 2 and 3, in which positions they permit the free forward movements of the slides into set positions.

Figure 5:
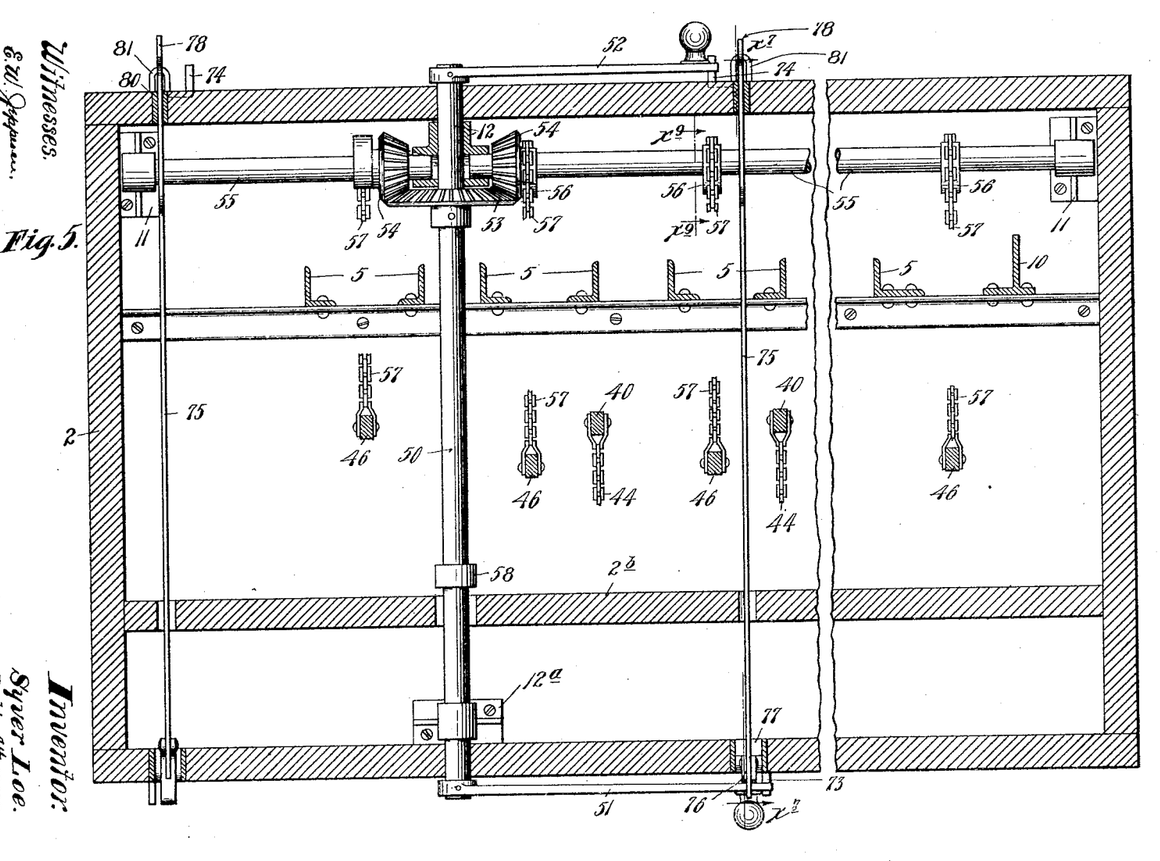
Fig. 5 is a horizontal section on the line $x^5 x^5$ of Fig. 3, some parts being broken away.

Extending from front to rear of the machine, through the walls of the base 2, and mounted in the bearings 12 and 12$^a$, is a rock-shaft 50, having at its forwardly-projecting end an operating-lever 51, and at its rear end an operating-lever 52, both of which levers project in the same direction. Within the base 2 said shaft 50 is provided with a beveled gear 53, that meshes with pinions 54, carried one by each section of a divided shaft 55, (see Figs. 3 and 5,) the sections of which shaft are journaled in the bearings 11 and 12. The right-hand section of the shaft 55 carries three eccentrics 56, and the left-hand section of said shaft carries a single eccentric 56$^a$. These eccentrics are connected by link chains 57, one to the lower end of each restoring-bar 46. The three chains at the right are secured to the upper portions of their coöperating eccentrics, while the chain at the extreme left is secured to the lower portion of its coöperating eccentric 56$^a$, this arrangement being made necessary because under a movement of the actuating-levers 51 upward and toward the left the sections of the shaft 55 are turned in reverse directions. The above-noted movements of the said actuating-levers causes the chains 57 to be wound up, thereby raising the restoring-bars 46 and moving them simultaneously rearward, and causing them to simultaneously restore all of the said actuating-slides to normal positions.

Figures 16, 17, 18, 19:
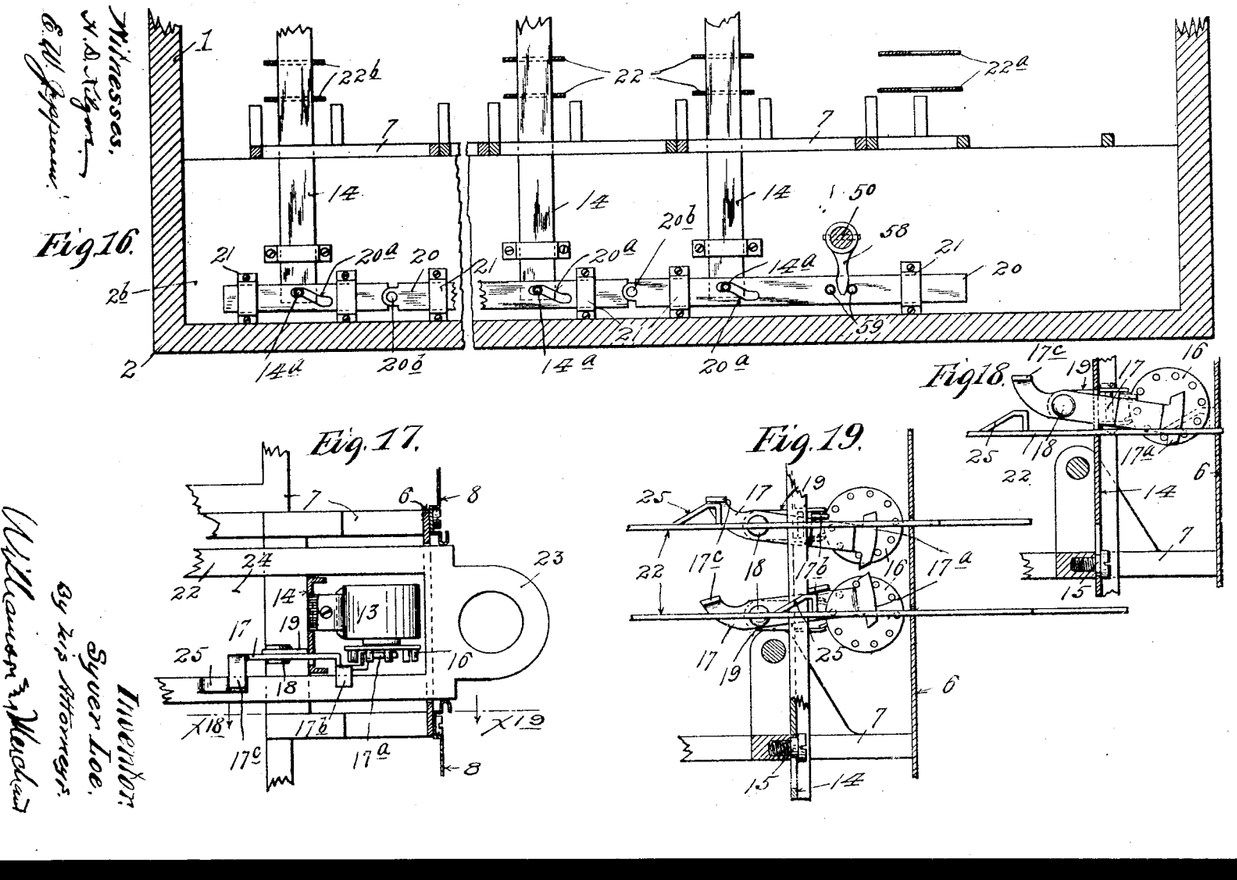
Fig. 16 is a transverse vertical section approximately on the line $x^{16}$ $x^{16}$ of Fig. 3.
Fig. 17 is a detail in horizontal section on the line $x^{17}$ $x^{17}$ of Fig. 3.
Figs. 18 and 19 are detail views in section on the line $x^{18}$ $x^{19}$ of Fig. 17, but illustrating different positions of the parts of the register-actuating escapement.

The rock-shaft 50 has a depending tappet or arm 58, which coöperates with pins or projections 59 on the right-hand section of the heretofore-described cam-bar 20 (see Figs. 3 and 16) to impart a slight reciprocating movement to the said cam-bar 20, as will be more fully set forth in the description of the operation. Fig. 16 illustrates normal positions of the parts therein shown.

*Vote-restricting mechanism.*—In many States and districts women are permitted to vote for candidates for certain offices—such, for instance, as for members of the school board—and it is desirable that provisions be made for quickly setting the machine so that it may be used for the above purpose and for no other. In the machine illustrated I assign the two register-actuators at the bottoms of all the columns except the column at the extreme right, together with the coöperating registers, to candidates for the offices of members of the school board and make arrangement whereby all other actuators in the machine may be locked and rendered inoperative.

To accomplish the above, I have provided four lock-blades 60, (see Figs. 2, 3, and 6,) which, as shown, are secured for vertical adjustments by set-screws 60$^a$ to vertical rock-shafts 61, mounted in the horizontal frame-brackets 7 and supported by collars 61$^a$, that rest upon the lower members of said brackets. (See Fig. 3.) At their upper ends the said lock-blades 60 are adjustably secured by screws or other suitable devices to depending flanges 62 of heads 63, which heads are rigidly secured to the upper ends of the said vertical rock-shaft 61. The several shaft-heads 63 are coupled to a common reciprocating bar 64 by screws or crank-pins 65, located at points eccentric to the axes of the respective shafts 61. (See particularly Figs. 3 and 6.) At its right-hand end the bar 64 is guided by a keeper 66 on the side of the case 1, and at its other end it is provided with a nut-block 67, through which is screwed the threaded end of a dial-spindle 68. This dial-spindle works through the left-hand side of the case 1 and, as shown, through a bearing 69, in which bearing it is free to rotate, but is held against endwise movements by a pin $69^a$, engaging a peripheral groove $68^a$ of said spindle. At its extreme outer end said spindle is formed or provided with a knurled head 70, by means of which it may be freely turned.

Figure 6:
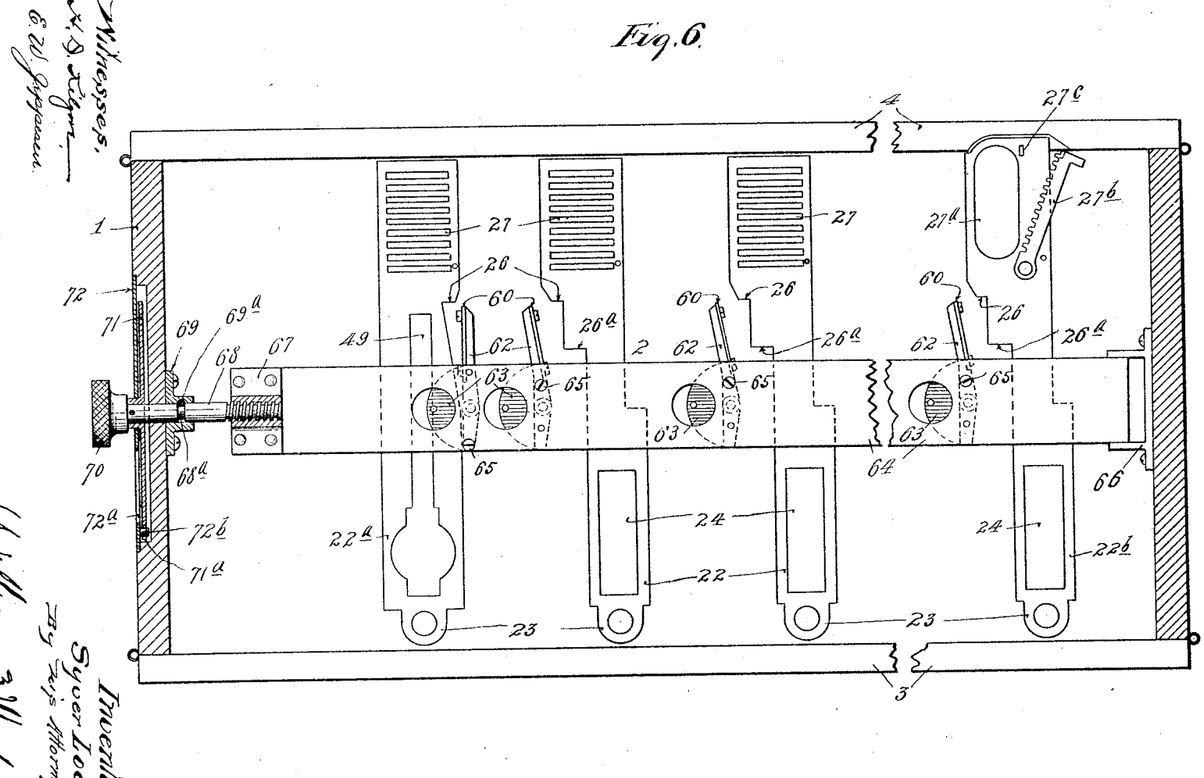
Fig. 6 is a horizontal section on the irregular line $x^6$ $x^6$ of Fig. 3, some parts being broken away.
Figures 13, 15:
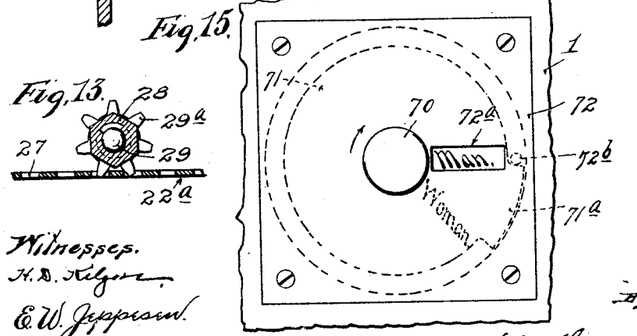
Fig. 13 is a detail in vertical section on the line $x^{13}$ $x^{13}$ of Fig. 12.
Fig. 15 is a detail in side elevation looking from the left toward the right at the parts shown in Fig. 6, some portions being broken away.
Figure 14:
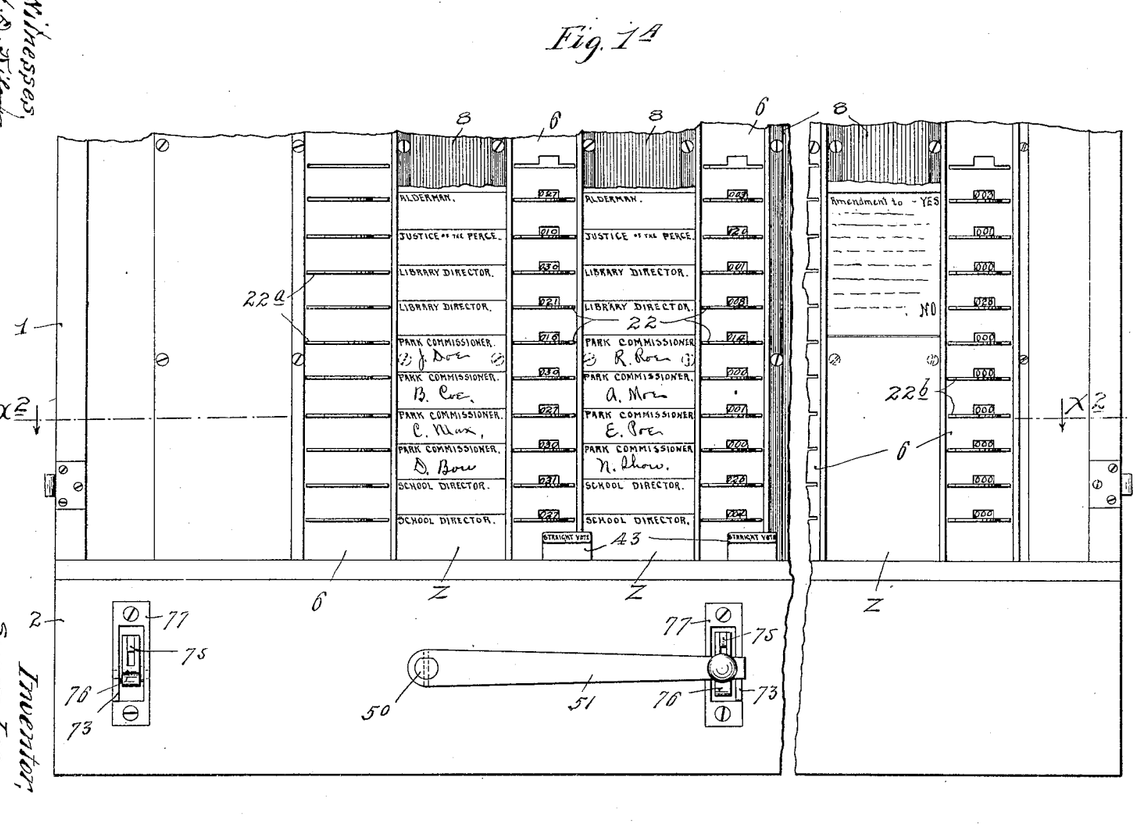

Secured to the spindle 68, just inward of its head 70, and working in a countersunk seat in the left-hand side of the case 1 is a dial 71, having a peripheral stop-lug $71^a$. Secured to the left-hand side of the case 1 and covering the dial 71 is a plate 72, having a sight opening or slot $72^a$ and an inwardly-projecting stop pin or lug $72^b$. On the face of the dial 71 is marked the word "Man" and the word "Woman." The stop-lug $71^a$ is so related to the stop-lug $72^b$, as shown in Fig. 15, that when one extremity thereof is engaged with the stop $72^b$ the word "Man" will be seen through the sight-opening $72^a$; but when the said dial is given nearly a complete rotation, so as to bring the other extremity of its lug $72^b$ into engagement with said stop, the word "Woman" will appear at the said sight-opening. Figs. 6 and 15 illustrate normal positions of the parts, and by reference to Fig. 6 it will be noted that the lock-blades 60 stand in inoperative position, so that they do not intercept or lock any of the actuating-slides. However, a movement of the spindle 68 sufficient to bring the word "Woman" on the dial 71 into line with the sight-opening $72^a$ will draw the bars 64 toward the left, and thus carry the lock-blades 60 into positions to lock all of the actuating-slides except the two members at the bottoms of the three columns at the left. This latter-noted adjustment, as is evident, will set the machine so that women may vote only for the several candidates for the school board or other office to which the said lower slides are assigned.

*Machine-locking mechanism.*—Attention is here directed to Figs. $1^a$, 3, 5, and 7. Secured to and projecting from the front wall of the base 2 in proper position on the opposite sides of the rock-shaft 50 to engage the free end of the actuating-lever 51 are stops 73. At corresponding points on the rear wall of the base 2 are fixed stops 74, which intercept the free end of the operating-lever 52 in its two extreme positions.

Figure 7:
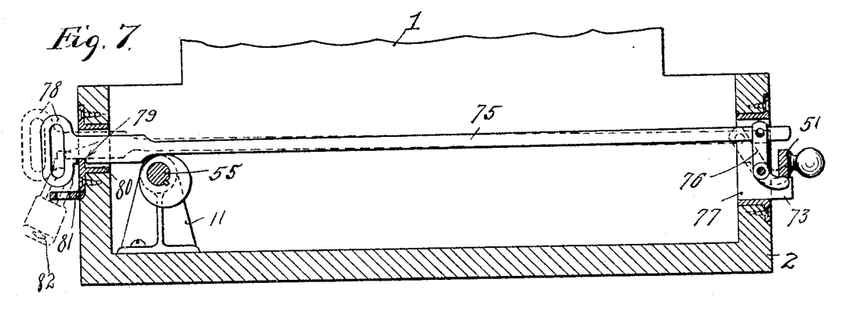
Fig. 7 is a vertical section through the lower portion of the machine on the line $x^7$ $x^7$ of Fig. 5.

Extending through the base of the machine, from front to rear thereof, in close proximity to the respective front and rear stops 73 74 are lock-bars 75, which at their forward ends are pivotally connected to the upper ends of bell-cranks 76, pivoted, as shown in Fig. 7, within metallic frames 77 set into the front wall of the base 2. The lower ends of these bell-cranks stand in positions to be engaged by the free end of the operating-lever 51, and when thus engaged and pressed downward, as shown in said Fig. 7, the extreme forward end of the connected lock-bar 75 overlies the free end of said lever 51 and prevents return movement thereof. At their rear ends the said lock-bars 75 are shown as formed with looplike finger-pieces 78, and forward thereof, on their under edges, they are formed with locknotches 79, which in the position of the parts shown in Fig. 7 engage with the lock-flange of a metallic bushing 80. (Shown as set into the rear wall of the base 2.) In close proximity to one of the bushings 80 is a projecting perforated lug 81, through which and the loop 78 of the right-hand lock-bar 75, as viewed in Fig. 5, the staple of a padlock 82 may be passed, as indicated by dotted lines in Fig. 7, to lock the entire machine. The action of the mechanism described in the last heading above given will further appear under the description of operation.

Operation: When the machine is to be used, the front plate 3 of the case 1 should of course be removed. As already stated, the actuating slides or keys normally stand in the positions indicated in the drawings, and the register-supporting bars 14 are held upward, so that the ears $17^b$ and $17^c$ stand above the lines of movement of the coöperating cam-lugs 25 of the said slides. Hence a person voting may move any slide forward into a set position and again back into normal position without having produced any action on the registers. This enables a person to change his vote after he has moved a slide to a set position. The manner in which the so-called "vote-limiting" mechanism operates to prevent the voter from casting more than the proper number of votes for any particular office has already been described. The following concrete example is, however, here given for additional clearness. The group of four pinions and hubs, (shown at the right in Fig. 4 and at the left in Fig. 2,) it will be remembered, is permitted four steps of expanding movement between the underlying and overlying stop-brackets 36. This group in the illustration given (see also Fig. $1^a$) is assigned to the office of park commissioners, to which four candidates are to be elected, both the Republican and Democratic tickets having marked thereon the names of four candidates for that office. The voter first pulls the slide in line at the right with the name of J. Doe, thus causing an expansive or extending movement of the coöperating primary lock-bar, and this movement of said lock-bar imparts movement to the upper pinion of the group, and hence imparts one step of expanding movement to the said group of pinions of the secondary lock device. The voter next pulls the slide in line at the right, with the name of R. Roe, and thereby imparts a second step of expanding movement to the said primary lock-bar and to the said upper pinion of the said group in the secondary lock device. The voter has now cast two votes—one for a Republican and one for a Democrat. He next, we will assume, pulls the slide in line at the right, with the name of D. Bow, and thereby imparts a step of expanding movement to the lower primary lock-bar of the group and thence to the lower pinion of the said group in the secondary lock mechanism. This movement of the said lower pinion of course imparts the third step of expanding movement to the group of pinions and hubs by raising the three pinions and hubs just above the same. The fourth step of movement in a like manner may be imparted to the said group of pinions and hubs by drawing forward, either from the Republican or from the Democratic or from the Independent column, a slide not hitherto set. This being done, the limit of expansion of the pinions and hubs of the said group is reached and no further slides assigned to the office of park commissioner either in the Republican, the Democratic, or the Independent columns can be drawn forward, and hence, of course, no further votes can be cast for the said office of park commissioner. In casting votes for independent candidates the names of such candidates may be written on pasteboard disks, and these may be dropped into a suitable receptacle (not illustrated in this application) through perforations formed in the independent slides $22^a$, near their forward ends. This feature of construction, however, is not the subject-matter of the present application, and need not herein be more fully set forth, since the same is fully set forth and claimed in a companion application filed by me of even date herewith, entitled "Independent vote mechanism for voting-machines." After the voter has drawn forward into set positions slides representing his entire vote, he will give a signal to the attendant, who from the back of the machine (see Figs. 5 and 7) will raise the free end of the lock-bar 75 and draw the same slightly rearward into the position indicated by dotted lines in said Fig. 7, thereby releasing the operating-lever 51. The voter then takes hold of the lever 51 and turns the same over against the left-hand stop 73 and against the projecting end of the left-hand bell-crank 76. (See Fig. $1^a$.) The engagement of the free end of the lever 51 with the said bell-crank draws the left-hand lock-bar 75 forward into a position corresponding to that illustrated by full lines in Fig. 7, in which position the said lock-bar locks the said lever and is itself locked by the left-hand lock-flange 79. The initial movement of the lever 51 from the right toward the left, as just described, causes the tappet 58 on the shaft 50 (see Fig. 16) to act upon the left-hand pin 59 and move the cam-bar 20 toward the left, thereby lowering the register-supporting bars 14, the registers 13, and their escapement-dogs 17 into the lowered positions indicated in Fig. 19. By reference to said Fig. 19 it will be seen that the cam-lug 25 of a slide which has been left in normal position when the indicators and escapement-dogs have been lowered will be brought into close engagement without action upon the ears $17^c$ of the coöperating escapement-dogs 17. It will also be seen that when the said indicators and their escapement-dogs are lowered, as above stated, the cam-lug 25 of a slide which has been drawn forward into a set position engages with the ears $17^b$ of the coöperating escapement-dog 17, thereby forcing the operative end of said dog forward and causing its upper cam-lug $17^a$ to operate upon the pins of the coöperating pin-wheel 16, and thereby impart a half-step of movement to the said wheel and to the unit member of the corresponding register. When the said set-slide is forced back to normal position by the restoring-bars, the cam-lug 25 thereof engages the ear $17^c$ of the said dog and forces the same again downward, thereby causing the lower cam-lug $17^a$ thereof to impart the final half-step of movement to the said pin-wheel. By reference to Figs. 18 and 19 it will be seen that in both positions of the escapement-dog its cam-lugs $17^a$ project between the pins of the pin-wheel 16 and positively lock the same against rotation in either direction. This prevents accidental or improper movements of the register. When, however, the escapement-dog stands in an intermediate position, it is possible to turn the said pin-wheel so as to bring the wheels of the register quickly back to zero. Under the movement of the operating-lever 51 from the right toward the left, as above described, and at a time after the register-supporting bars 14 have been lowered, as above stated, the eccentrics 56 and $56^a$, acting through the chains 57, raise and draw rearward the restoring-bars 46, thereby simultaneously moving all of the set-actuating slides back to the normal positions, under which movements of the said slides the register-actuating dogs are given their second or return movements, as above described. To set the machine so that it is again ready for action, the attendant at the back of the machine again returns the levers 51 and 52 and parts operated thereby back to their normal positions.

What I claim, and desire to secure by Letters Patent of the United States, is as follows:

1. In a voting-machine, the combination with several groups of registers and register-actuators assigned to different political parties, but to the same office, of a plurality of distensible lock-bars having sections that are subject to actuators of the different groups, and a secondary vote-limiting mechanism comprising a series of shiftable elements, and stops for limiting the aggregate movements of the series of shiftable elements, the said shiftable elements being subject one to each of the said distensible lock-bars, whereby the total number of votes which may be registered for a particular office is limited.

2. In a voting-machine, the combination with several groups of registers and register-actuators, assigned to different political parties, but to the same office, of a plurality of distensible lock-bars having sections that are subject to one of the actuators of each group, and a secondary vote-limiting mechanism comprising a series of laterally-shiftable rotary elements, rotated one by each of said distensible bars, and stops for limiting the shifting movements thereof and thereby limiting the total number of votes which may be registered for the particular office.

3. In a voting-machine, the combination with several series of registers and register-actuators, appropriated to the different political parties, but to the same office, of a plurality of distensible lock-bars made up of rotary and non-rotary sections having threaded engagement, the rotary sections of each bar being subject one to an actuator of each group, and a secondary lock mechanism comprising a group of non-rotary shiftable hubs, located side by side, each nut member being subject to one of the said distensible lock-bars, and stops limiting the spreading movements of said hubs and nut members, to thereby limit the total number of votes which may be cast for the particular office.

4. In a voting-machine, the combination with several groups of registers and register-actuating slides, said slides having wide-faced racks, of a plurality of distensible lock-bars made up of rotary and non-rotary sections having threaded engagement, said rotary sections having pinions meshing with and movable laterally over said wide-faced racks, and secondary vote-limiting mechanism comprising a plurality of laterally-shiftable rotary members, each subject to one of said distensible bars, and stops for limiting the spreading or shifting movements of the said members, substantially as described.

5. In a voting-machine, the combination with several groups of registers and register-actuating slides having wide-faced racks, of a plurality of primary lock-bars made up of rotary and non-rotary sections having threaded engagement, the rotary sections having pinions meshing with and sliding over the racks of said actuating-slides, gears subject to each distensible bar, and a secondary vote-limiting mechanism comprising a group of shiftable non-rotary hubs, pinions screw-threaded on said hubs and meshing each with one of said bar-actuating gears, and stops for limiting the spreading movements of said hubs and pinions, to thereby limit the total number of votes which may be cast for a particular office.

6. In a voting-machine, the combination with a group of registers and register-actuators, of vote-limiting mechanism comprising a group of laterally-expansible rotary elements, and divided or two-part stop-brackets and interposed coöperating stop-washers removably and adjustably supported and arranged to limit the expanding movements of the said shiftable rotary elements, substantially as described.

7. In a voting-machine, the combination with a group of registers and register-actuators, of vote-limiting mechanism comprising a group of non-rotary slidable hubs, nuts screw-threaded on said hubs and subject to said actuators, washers embracing the groups of hubs and nuts, and two-part stop-brackets constructed to embrace said washers and to detachably hold the same in working position, substantially as described.

8. The combination with several columns or series of registers and register-actuators, of distensible vote-limiting lock-bars made up of shiftable sections having threaded engagement, said bars having sections which are subject one to an actuator of each column, substantially as described.

9. The combination with several columns or series of registers and register-actuators, of vote-limiting mechanism comprising fixed stops and a plurality of distensible lock-bars, each bar having an adjustable stop coöperating with one of the said fixed stops, and each bar having sections subject one to an actuator of each column, substantially as described.

10. The combination with several columns of registers and register-actuating slides, said slides having wide-faced racks, of vote-limiting mechanism comprising laterally-spaced fixed stops; a plurality of distensible lock-bars made up of rotary and non-rotary sections having screw-threaded engagement, said rotary sections having pinions meshing with the racks of said slides, said bars having stops engageable with said fixed stop-plates, substantially as described.

11. The combination with several columns of registers and register-actuators, of vote-limiting mechanism comprising fixed stops and a plurality of distensible coöperating bars, each bar being made up of sections united by right-and-left threads, and each bar having sections which receive rotary movement, one from an actuator of one of each of the groups, substantially as described.

12. The combination with a column or series of registers and register-actuators, of a movable register-support for said series of registers, normally holding the same in inoperative positions, so that said actuators may be moved into "set" positions, without action on said register, and means for restoring the set actuators to normal positions arranged to act under an initial movement to move said register-support and carry said registers into operative positions, and subsequently to operate the same, substantially as described.

13. The combination with a column or series of registers and register-actuators, the unit members of said registers having pin-wheels, of oscillating escapement-dogs, operated by said actuators and having their heads formed with reversely-projecting and reversely-beveled cam-lugs that work within the arc of the pins of said pin-wheels and engage the pins, first on one side and then on the other of said wheels, and positively lock the said wheels against rotation, substantially as described.

14. The combination with a column or series of registers and register-actuating slides, said slides having register-actuating projections, and the unit members of said registers having escapement-wheels, of escapement-dogs operating on said escapement-wheels, to impart step-by-step movements thereto, and to lock the same, said dogs receiving motion from said actuating-slides and being held normally locked by the said actuating projections thereof, substantially as described.

15. The combination with several columns of registers and register-actuators, of pivoted lock-blades coöperating with said columns of actuators, but extending for action on only a part thereof, and means for moving said blades endwise to vary the number of actuators controlled by said lock-blades, substantially as described.

16. In combination with several columns of registers and register-actuating slides, said slides having lock-shoulders, of a plurality of movable lock bars or blades coöperating with the lock-shoulders of said slides, and vertically adjustable for engagement with more or less thereof, a bar connecting the several lock-blades, and a screw rod or spindle operating on said bar to move said blades to and from operative positions, said rod or spindle having an indicator showing its two extreme positions, substantially as described.

17. The combination with one or more columns of registers and register-actuators, of actuator-restoring bars, mounted for parallel movements in their actions on the set register-actuators, a rock-shaft having operating-levers at both its ends, the one within reach of the voter, and the other within reach of the attendant, connections from said rock-shaft to said restoring-bars, for operating them, locks for locking said rock-shaft in its two extreme positions, and lock-releasing devices extended to points out of the reach of the voter, and within reach of an attendant, substantially as described.

18. The combination with a series of registers and register-actuators, of vote-limiting mechanism involving a group of laterally-shiftable rotary pinions and coöperating stops, and toothed elements normally meshing with said pinions and receiving movement from said actuators, and having movement into and out of mesh with said pinions, substantially as described.

In testimony whereof I affix my signature in presence of two witnesses.

SYVER LOE.

Witnesses:
H. D. KILGORE,
F. D. MERCHANT.